March 15, 1932. R. MacGREGOR 1,849,801
SHIP'S HATCH COVER
Filed Aug. 29, 1931  2 Sheets-Sheet 1

INVENTOR:
ROBERT MacGREGOR
BY Ruege & Boyce
ATTORNEYS

March 15, 1932.  R. MacGREGOR  1,849,801
SHIP'S HATCH COVER
Filed Aug. 29, 1931    2 Sheets-Sheet 2
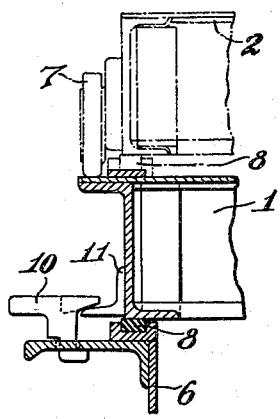
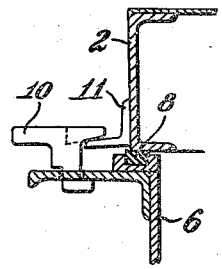
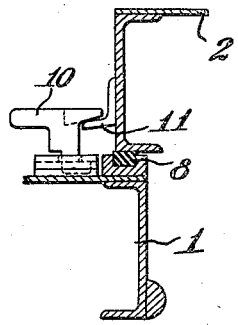
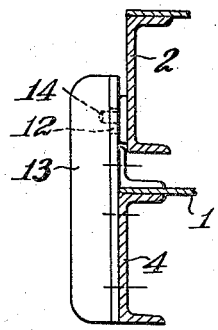
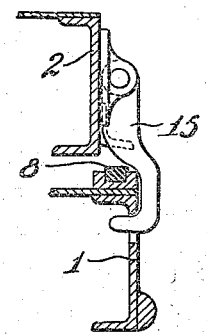
INVENTOR:
ROBERT MacGREGOR
BY Luege & Boyce
ATTORNEYS.

Patented Mar. 15, 1932

1,849,801

UNITED STATES PATENT OFFICE

ROBERT MacGREGOR, OF LONDON, ENGLAND, ASSIGNOR TO MacGREGOR & KING, LIMITED, OF LONDON, ENGLAND, A BRITISH COMPANY

SHIP'S HATCH COVER

Application filed August 29, 1931, Serial No. 560,113, and in Great Britain December 3, 1930.

My invention has reference to steel hatch covers and has for its object to provide a strong construction of cover of this description, with means to facilitate removal and positioning, and with adequate weathertight arrangements for the relatively movable parts which are a consequence of the construction employed in attaining the first above-mentioned parts of the object.

According to my invention the hatch cover is constructed in two or more parts, one part being pivoted or hinged on the coaming and another part slidable on the coaming at a higher level than the pivoted or hinged part aforesaid so as to slide over the coaming onto the top thereof, and further sections, if any, slidably carried on the slidable part and so on, on adjacent parts. A preferable form is the employment of two sections only and this embodiment will be described by way of example.

This embodiment is illustrated by the accompanying drawings, wherein:—

Figure 1:
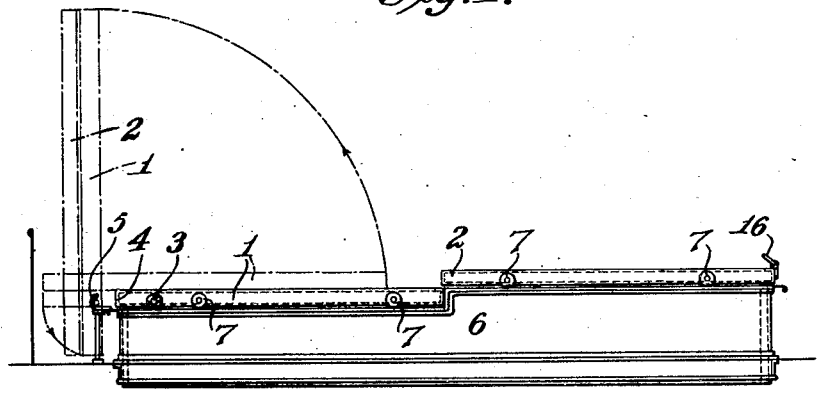
Figure 2:
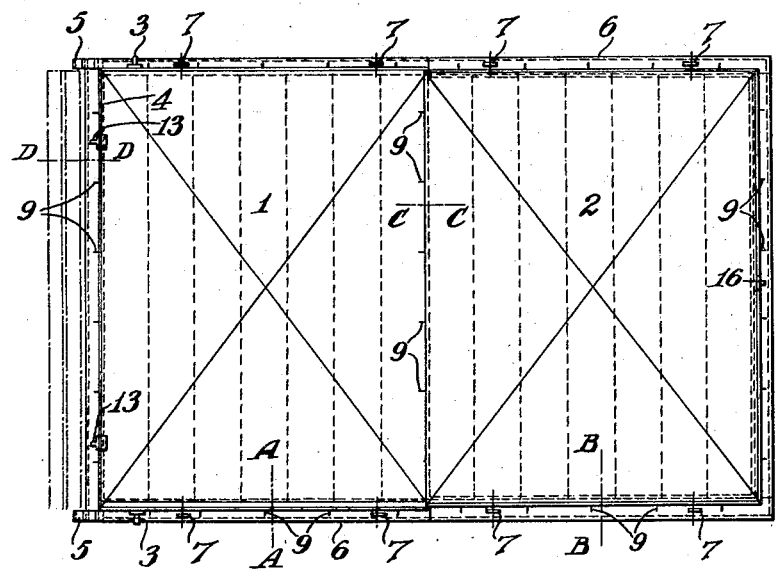

Figure 1 is a diagrammatic elevation.
Figure 2 is a plan view.
Figure 3 is a section on A—A.
Figure 4 is a section on B—B.
Figure 5 is a section on C—C.
Figure 6 is a section on D—D (with the top or right-handed part moved into superimposed position); and
Figure 7 is a section also taken on C—C, but with the parts as described with reference to Figure 6.

The steel hatch cover is divided into two portions 1 and 2. One part (1) is provided with pivots 3, 3 at a point so far from the end 4 of the hatch 1 that by sliding back this portion for the pivots 3, 3 to drop into bearings 5, 5 on the coamings or framework, the cover comes close down to the deck when pivoted vertically—as shown in dot-and-dash lines in Figure 1. The other piece 2 is made to slide on or off the pivoted portion 1 and is on a higher part of the coaming 6. For sliding, each portion is provided with four supporting wheels 7 with eccentric bushes, which can be given a half turn so that the weight of the cover members or parts 1 and 2 will be taken on watertight packing 8 instead of on the wheel spindles.

When the hatch is to be opened the upper sliding portion 2 is run back to be superimposed on the pivoted portion 1, and the two portions are run back until the pivots 3, 3 on the sides of the lower portion 1 meet the aforesaid pivot bearings 5, 5 at or near the end of the hatch coaming 6, and the two portions are then lifted by one operation. This arrangement provides for a partly balanced hatch cover, which reduces the lifting effort required and also reduces the height of the cover when vertical. The hatch coaming is stepped as shown in Figure 1 so that the underside of the sliding portion 2 is above the upper side of the pivoted portion 1.

My invention also covers a pivoted or hinged hatch portion 1 wherein the same is non-slidable, but may be directly swung up about its pivots or hinges. The section portion 2 would be slidably mounted on such a hinged portion as already described.

At suitable points around the edges of the covers (indicated diagrammatically by the lines 9 in Figure 2) cleats 10 and clamping lugs 11—see Figures 3, 4 and 5—are provided for battening down the hatches on to their watertight seatings 8.

To fix the top cover part 2 to the underneath part 1 when superimposed, a pair of upstanding projecting eyes 12 (Figure 6), which can conveniently be formed in T-angles 13 (Figures 2 and 6) are carried by the end 4 of the part 1, and a pair of pins 14 (Figure 6) projecting from one end of the part 2 are adapted to run into said eyes respectively. At the opposite ends of the parts 1 and 2 a swinging hook 15 on the upper member is adapted to engage the lower member. (Figure 7). The upper member 2 also has a lifting eye 16 (Figures 1 and 2) whereby the assembly may be hoisted up to swing about the pivots 3, 3.

I claim:
1. Ships' hatches including a coaming, high and low steps to the coaming, a plurality of cover parts for the coaming, one of the cover parts being hingedly movable on a low step of the coaming, and the other cover part being slidable on a high step of the coaming and on the hingedly movable part.

2. Ships' hatches including a coaming, a plurality of cover parts for the coaming, hinge pin sockets on the coaming, one of the cover parts having hinge pins to engage said sockets, said cover part having a slidable movement on the coaming to cause the engagement of said hinge pins and hinge sockets, and the other cover part having a slidable movement on the first-mentioned cover part.

3. Ships' hatches including a coaming, a plurality of cover parts for the coaming, hinge pin sockets on the sides of the coaming, hinge pins on one of the cover parts spaced away from an end thereof and adapted to engage the said hinge-pin sockets, said cover part having a slidable movement on the coaming to cause the engagement of the said hinge pins and hinge sockets, whereby the cover part can swing upwards with a balancing length of it swinging downwards, and the other cover parts having a slidable movement from the coaming on to the first-mentioned cover part so as to swing therewith.

4. A ship's hatch cover according to claim 1 wherein the slidable parts are furnished with supporting wheels with eccentric bushes whereby the weight of the cover parts may be placed on the wheels or on watertight packings as may be desired.

5. Ships' hatches including a coaming, a plurality of cover parts for the coaming, hinge pin sockets on the coaming, one of the cover parts having hinge pins to engage said sockets, said cover part having a slidable movement on the coaming to cause the engagement of said hinge pins and hinge sockets, and the other cover parts having a slidable movement on the first-mentioned cover part, the top slidable part having means whereby it may be temporarily secured to an underneath part on which it has been superimposed.

6. Ships' hatches including a coaming, high and low steps to the coaming, a plurality of cover parts for the coaming, one of the cover parts being hingedly movable on a low step of the coaming, and the other cover part being slidable on a high step of the coaming and on the hingedly movable part, and further characterized in that a top slidable hatch part has pins on one edge which engage eyes formed in or on members on an underneath part when the top part has been moved to a superimposed position, and also has a hook member or members on an opposite edge to engage the adjacent edge of the underneath part.

In testimony whereof I have signed my name to this specification.

ROBERT MacGREGOR.